No. 869,277. PATENTED OCT. 29, 1907.
A. TRAVLAND.
BICYCLE BOAT.
APPLICATION FILED APR. 11, 1907.
3 SHEETS—SHEET 1.
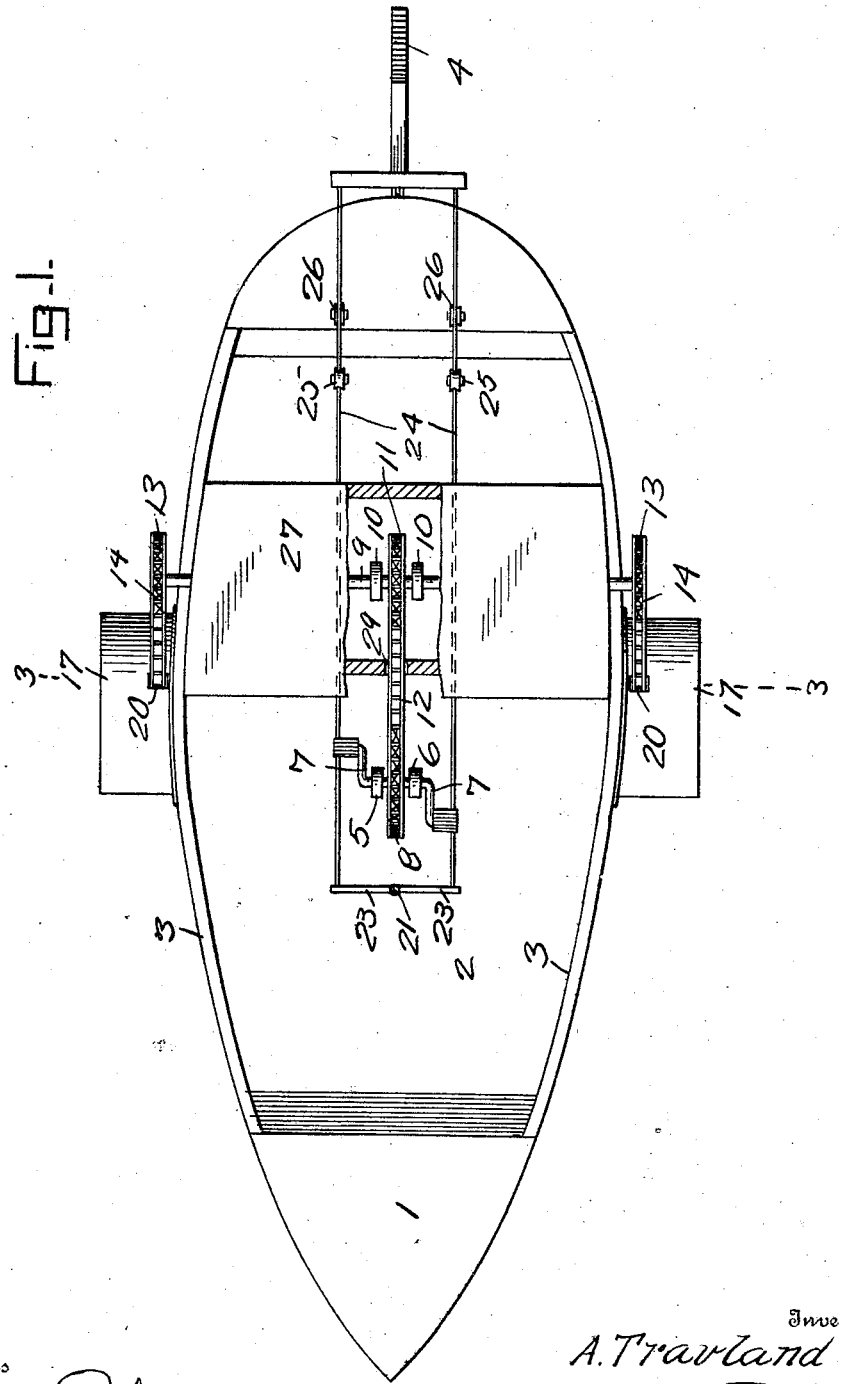
Witnesses
G. R. Thomas
Inventor
A. Travland
By
Attorneys

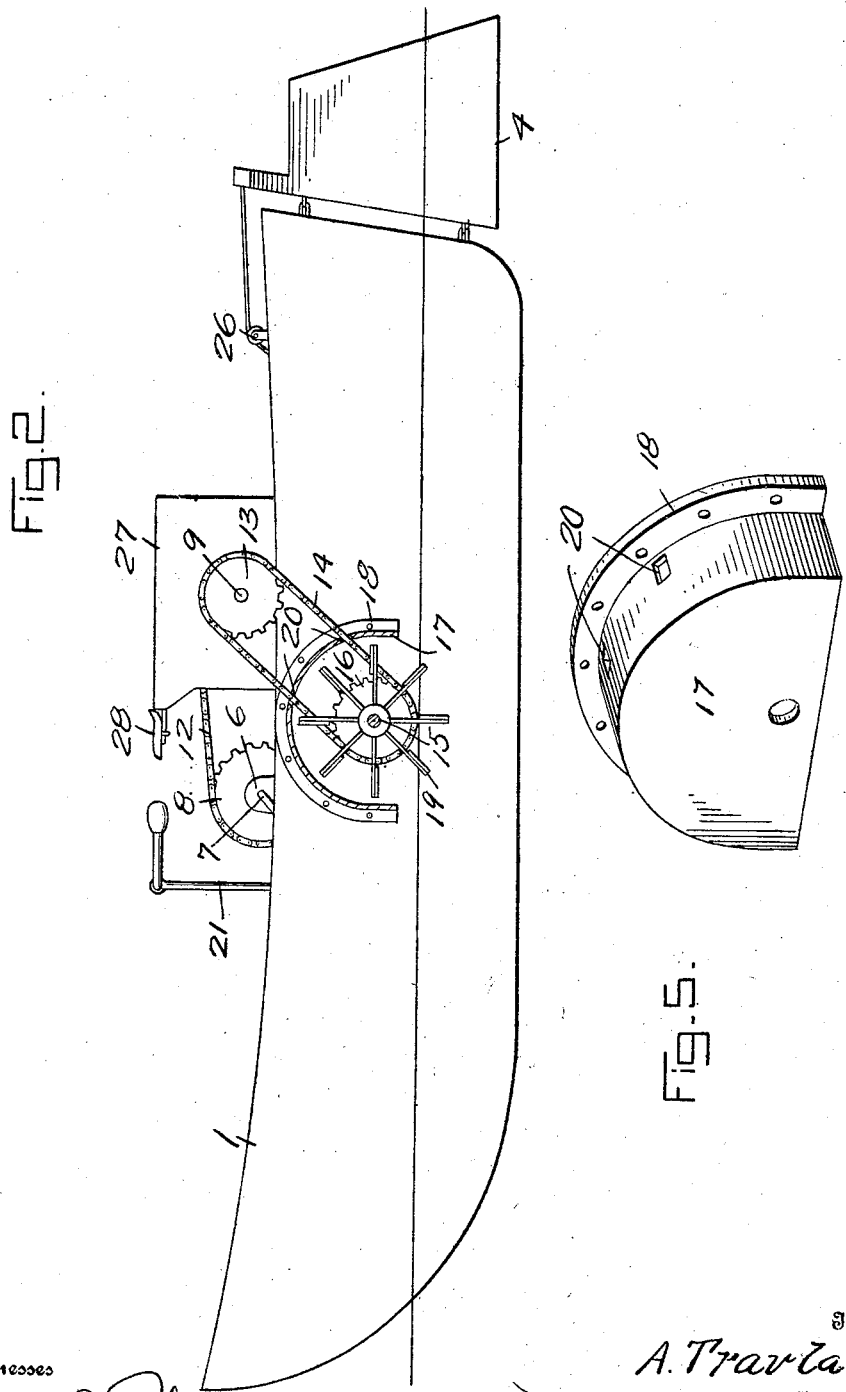

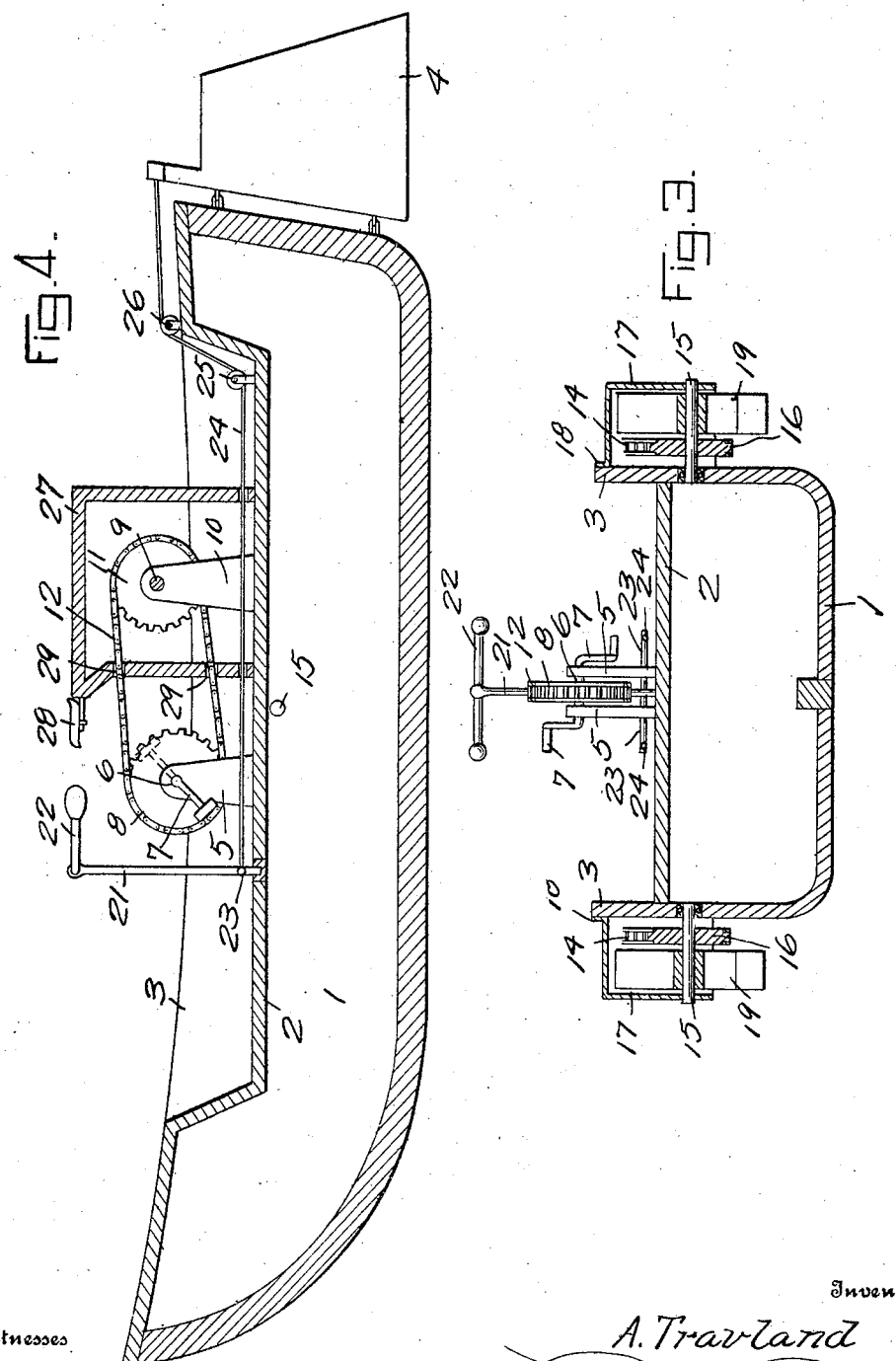

UNITED STATES PATENT OFFICE.

AANEN TRAVLAND, OF HOFFMAN, MINNESOTA.

BICYCLE-BOAT.

No. 869,277.  Specification of Letters Patent.  Patented Oct. 29, 1907.

Application filed April 11, 1907. Serial No. 367,669.

*To all whom it may concern:*

Be it known that I, AANEN TRAVLAND, a citizen of the United States, residing at Hoffman, in the county of Grant, State of Minnesota, have invented certain new and useful Improvements in Bicycle-Boats; and I do hereby declare the following to be a full, clear, and exact description of the invention, such as will enable others skilled in the art to which it appertains to make and use the same.

This invention relates to new and useful improvements in boats, and it has particular reference to a boat propelled by foot power and of the type known as "marine velocipedes."

In connection with a boat of the above type the invention aims as a primary object to provide a novel construction, combination and arrangement of parts, the details of which will appear in the course of the following description, in which reference is had to the accompanying drawings forming a part of this specification like characters of reference designating similar parts throughout the several views, wherein:

Figure 1 is a top plan view of a boat constructed in accordance with the present invention, parts being broken away to more clearly show the features of construction. Fig. 2 is a side elevation thereof, the cover for the paddle wheel being broken away at one side. Fig. 3 is a vertical transverse section on the line 3—3— of Fig. 1. Fig. 4 is a central longitudinal section thereof. Fig. 5 is a detailed perspective view illustrating the housings for the paddle wheels.

Referring specifically to the accompanying drawings the numeral 1 designates the hull including the deck 2, and the raised sides 3, the rudder 4 being secured at the stern in the usual manner. Centrally of the deck 2 are mounted alined bracket bearings 5 in which is journaled a transverse power shaft 6, the latter carrying on its projecting ends the pedals 7 and between said bearings a sprocket wheel 8. Rearwardly of the shaft 6 is a transverse shaft 9, journaled in bracket bearings 10 and projecting on each side beyond the sides of the boat. The shaft 9 has a centrally located sprocket 11 which is driven from the sprocket 8 by a chain 12. On its projecting ends the shaft 9 carries sprocket wheels 13 which serve by means of chains 14 to drive the transverse propeller shafts 15, the latter carrying sprockets 16 over which the chains 14 are trained. The shafts 15 are journaled in antifriction bearings in the hull 1 and in curved housings 17 secured to said hull by means of fastening devices engaged through offset flanges 18. The housings 17 are open at their lower ends and inclose the paddle wheels 19 fast on the respective shafts and likewise the sprockets 16, said housings having openings 20 in their offset portions to allow of the movement of the chains 14 therethrough.

The steering mechanism includes a vertical rock shaft 21 journaled in bearings in the deck 2, which at its upper end carries the handle bars 22 and at a point above the deck 2 carries the oppositely extending arms 23, the latter at their outer ends having connection with cables 24 which extend rearwardly the length of the deck and are trained over suitably supported guide pulleys 25 and 26 and at their ends are connected to the rudder 4 on each side thereof.

It is preferred to inclose the shaft 9 and the parts directly associated therewith in a housing 27, which supports a forwardly projecting seat 28 and which has openings 29 in its front wall to allow of the movement of the chain 12 therethrough.

It will be understood that the shaft 6 through the connections described drives the paddle wheels 19 in either direction and that the position of the rudder is controlled by movement of the vertical rock shaft 21.

From the foregoing description it will be seen that simple and efficient means are provided for accomplishing the objects of the invention but, while the elements herein shown and described are well adapted to serve the functions set forth it is obvious that various minor changes may be made in the proportions, shape and arrangement of the several parts without departing from the spirit and scope of the invention as defined in the appended claims.

What is claimed, is:

A boat of the type set forth, comprising the combination with the hull and its deck, of a pedal operated power shaft supported on said deck, a transverse shaft rearwardly of said power shaft, and driven therefrom, sprocket wheels located at the ends of said transverse shaft, curved housings having offset flanges secured to the hull at opposite sides thereof and open at their bottoms, transverse shafts having their ends journaled in said housings and in said hull, said housings being formed with spaced openings, sprocket wheels provided on said respective last named transverse shafts, chains connecting said end sprockets with said last named sprockets and working through said openings, and paddle wheels fast on said last named shafts.

In testimony whereof, I affix my signature, in presence of two witnesses.

AANEN TRAVLAND.

Witnesses:
  MARTIN HOLLAND,
  H. HENDRICKSON.